(12) United States Patent
Kendrick et al.

(10) Patent No.: US 12,453,932 B2
(45) Date of Patent: *Oct. 28, 2025

(54) ATMOSPHERIC WATER GENERATOR

(71) Applicant: Hydronomy, Inc., Orlando, FL (US)

(72) Inventors: Brittany Kendrick, Jacksonville, FL (US); Korey Salter, Jacksonville, FL (US); Xavier Henderson, Orlando, FL (US)

(73) Assignee: Hydronomy, Inc., Orlando, FL (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/346,543

(22) Filed: Jul. 3, 2023

(65) Prior Publication Data
US 2024/0001256 A1 Jan. 4, 2024

Related U.S. Application Data

(62) Division of application No. 17/381,713, filed on Jul. 21, 2021, now Pat. No. 11,878,264.

(51) Int. Cl.
*B01D 5/00* (2006.01)
*E03B 3/28* (2006.01)

(52) U.S. Cl.
CPC .......... *B01D 5/009* (2013.01); *B01D 5/0051* (2013.01); *B01D 5/006* (2013.01); *B01D 5/0072* (2013.01); *E03B 3/28* (2013.01)

(58) Field of Classification Search
CPC .... B01D 5/0051; B01D 5/006; B01D 5/0072; B01D 5/009; E03B 3/28
See application file for complete search history.

(56) References Cited

U.S. PATENT DOCUMENTS

| 3,035,418 A | * | 5/1962 | Wright | ............... E03B 3/28 62/394 |
| 4,433,552 A | * | 2/1984 | Smith | ............... E03B 3/28 62/93 |

(Continued)

FOREIGN PATENT DOCUMENTS

CN 111395455 A 7/2020

OTHER PUBLICATIONS

CN 111395455 Espacenet Translation Obtained Aug. 28, 2023, (Year: 2023).*

*Primary Examiner* — Jonathan Miller
(74) *Attorney, Agent, or Firm* — Wood IP Law, LLC; Theodore A. Wood

(57) ABSTRACT

Provided is a fresh water producing system that includes a renewable energy power system, an automated control module, an atmospheric condenser system, a conveyor, an aquatic suction device, a water reservoir; and a water purification filtration system. Also provided is a computer implemented method for turning ambient air into liquid that includes generating electricity with a renewable energy power system, executing a set of instructions with an automated control module, processing ambient air with an atmospheric condenser system, filtering the processed ambient air through a conveyor, distilling the processed ambient air through a water purification filtration system, transporting the processed ambient air through an aquatic suction device, and disposing the processed ambient air into a water reservoir.

11 Claims, 4 Drawing Sheets

(56) References Cited

U.S. PATENT DOCUMENTS

| | | | | |
|---|---|---|---|---|
| 6,574,979 | B2* | 6/2003 | Faqih | E03B 3/28 |
| | | | | 62/93 |
| 6,755,037 | B2* | 6/2004 | Engel | E03B 3/28 |
| | | | | 62/177 |
| 7,357,001 | B2* | 4/2008 | Yoon | E03B 3/28 |
| | | | | 62/389 |
| 10,071,918 | B2* | 9/2018 | Ackerman | B01D 5/006 |
| 10,532,935 | B2* | 1/2020 | Ackerman | B01D 5/006 |
| 10,752,519 | B2* | 8/2020 | Xu | C02F 1/18 |
| 10,987,610 | B1* | 4/2021 | Mayer | E03B 3/28 |
| 2002/0011075 | A1* | 1/2002 | Faqih | B01D 5/0087 |
| | | | | 62/285 |
| 2006/0065001 | A1* | 3/2006 | Bernardo Castanon Seoane | |
| | | | | B01D 53/265 |
| | | | | 62/93 |
| 2009/0211275 | A1* | 8/2009 | Castanon Seoane | |
| | | | | B01D 5/0051 |
| | | | | 62/93 |
| 2013/0213865 | A1* | 8/2013 | Hsu | B01D 5/0072 |
| | | | | 210/138 |
| 2016/0229706 | A1* | 8/2016 | Ackerman | C02F 1/16 |
| 2020/0108344 | A1* | 4/2020 | Vollmer | B01D 5/0051 |
| 2021/0354080 | A1* | 11/2021 | Alejo | C02F 9/00 |
| 2022/0011075 | A1 | 1/2022 | Masarik et al. | |

* cited by examiner

ATMOSPHERIC WATER GENERATOR

CROSS-REFERENCE TO RELATED APPLICATIONS

This application is a divisional of U.S. application Ser. No. 17/381,713, filed Jul. 21, 2021, which is incorporated herein by reference in its entirety.

FIELD OF THE INVENTION

This invention relates to a new and improved atmospheric water generator.

BACKGROUND OF THE INVENTION

Water covers 70% of the earth. However, only 3% of the earth's water is fresh water. The limited volume of fresh water on earth is dwindling to desperation. Water demands globally is projected to increase by 55% between 2000 and 2050. Statistics show that 1.1 billion of people worldwide lack access to fresh water, and at least 2.7 billion of people worldwide find fresh water scarce for at least one month out of the year. Fresh water is necessary for drinking, industry, agriculture, and is essentially the source of life on earth. The challenge with water scarcity is further conflated with compromised water quality and access.

The issues with water scarcity are conflated with compromised water quality and access. Quality and access associated with sourcing surface water is particularly a trying task for urban cities and rural towns. Urban communities and rural areas particularly lack access to appropriate and low-cost technology to produce fresh water. Quality and access are also a problem for non-rural and urban communities as these communities are stricken with the distribution of limited quantities. Current water sourcing and conveyance practices are environmentally and economically wasteful. The present invention provides a thriving solution to the challenges associated with global freshwater scarcity.

The present invention deploys the best solution to the challenges associated with global water scarcity. The present invention provides a hardware solution by decentralizing the current water sourcing methodology. Solar energy independently powers the decentralized water production for an individual's household plumbing system. This system absolves the dependency households have on a municipal water supply. The present system further benefits customers with water cost savings, reduced carbon emission related to water use, and enhances health benefits.

The present invention provides consumers with water cost saving, reduced carbon mission related to water use, and enhanced health benefits. The annual cost to produce water with the present system is approximately 80% lower than the annual average household water utility expense. Because the invention is entirely powered by solar energy, the system allows a household to contribute zero carbon emissions to the environment by use and consumption of water. The invention's water filtration component eliminates heavy metals, bacteria, microorganisms, and promotes alkaline water with high pH.

SUMMARY OF THE INVENTION

It is essential to the present disclosure, all embodiments are provided as illustrative and non-limiting representatives of various possible embodiments. In addition, the terms "is", "can", "will" and the like are herein uses as synonyms for an interchangeable with terms such as "may", "may provide for", and "it is contemplated that the present invention may" and so forth.

Furthermore, all elements listed by name, encompass all equivalents for such elements. For example, solar panel, batteries, heat sink, peltier chips, all encompass equivalents for such examples. Such equivalents are contemplated for each element named herein.

For purposes of summarizing, certain aspects, advantages, and novel features of the present invention are provided herein. It is to be understood that not all aspects, advantages, or novel features may be provided in any one particular embodiment. Thus, the disclosed subject matter may be embodied or carried out in a manner that achieves or optimizes one aspect, advantages, or novel features or group of features without achieving all aspects, advantages, or novel features as may be taught or suggested.

In view of the foregoing disadvantages inherent in the known art, the present invention provides a novel solution to the challenges associated with global water scarcity.

The features of the invention, which are believed to be novel, are particularly pointed out and distinctly claimed in the concluding portion of the specification. These and other features, aspects, and advantages of the present invention will become better understood with reference to the following drawings and detailed description.

In an embodiment of the invention a fresh water producing system is provided. The water producing system includes a renewable energy power system, an automated control module an atmospheric condenser system, a conveyor, an aquatic suction device, a water reservoir, and a water purification system. The components of the system are fixedly and communicatively attached to work conjointly.

In a further embodiment of the present invention a computer implemented process for turning ambient air into liquid is provided. The process includes generating electricity with a renewable energy power system, executing a set of instructions by an automated control module, processing of ambient air by an atmospheric condenser, filtering of the processed ambient air by a conveyor, distilling the processed ambient air with a water purification filtration system, transports the processed ambient air with an aquatic suction device, and disposing the processed ambient air into a water reservoir.

The embodiment of the invention described herein are exemplary and numerous modifications, variations, and rearrangements can be readily envisioned to achieve substantially equivalent results, all of which are intended to be embraced within the spirit and scope of the invention. Furthermore, while the preferred embodiment of the invention has been described in terms of the components and configurations, it is understood that the invention is not limited to those specific dimensions or configurations but is to be accorded the full breadth of the spirit of the invention.

BRIEF DESCRIPTION OF THE DRAWINGS

These and other features, aspects and advantages of the present invention will become better understood with regard to the following description, appended claims, and accompanying figures. The system comprises of a solar renewable energy system, an automated control module, an atmospheric condenser system, a conveyor, an aquatic suction device, a water reservoir, and a water filtration system.

DETAILED DESCRIPTION

The present invention overcomes the limitations of the prior art by providing a novel solution to the challenges associated with global water scarcity.

It is essential to understand that the drawings and the associated descriptions are provided to illustrate potential embodiments of the invention and not to limit the scope of the invention. Reference in the specification to "one embodiment" or "an embodiment" is intended to indicate that a particular feature, structure, or characteristics described in connection with the embodiment is included in at least an embodiment of the invention. The appearances of the phrases "in one embodiment" or "an embodiment" in various places in the specification are not necessarily all referring to the same embodiment.

As used in this disclosure, except where the context requires otherwise, the term "comprise" and various of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known features, elements or techniques may be shown in detail in order not to obscure the embodiments.

The system of the present invention is suitable for solution to the challenges associated with global water scarcity.

Figure 1:
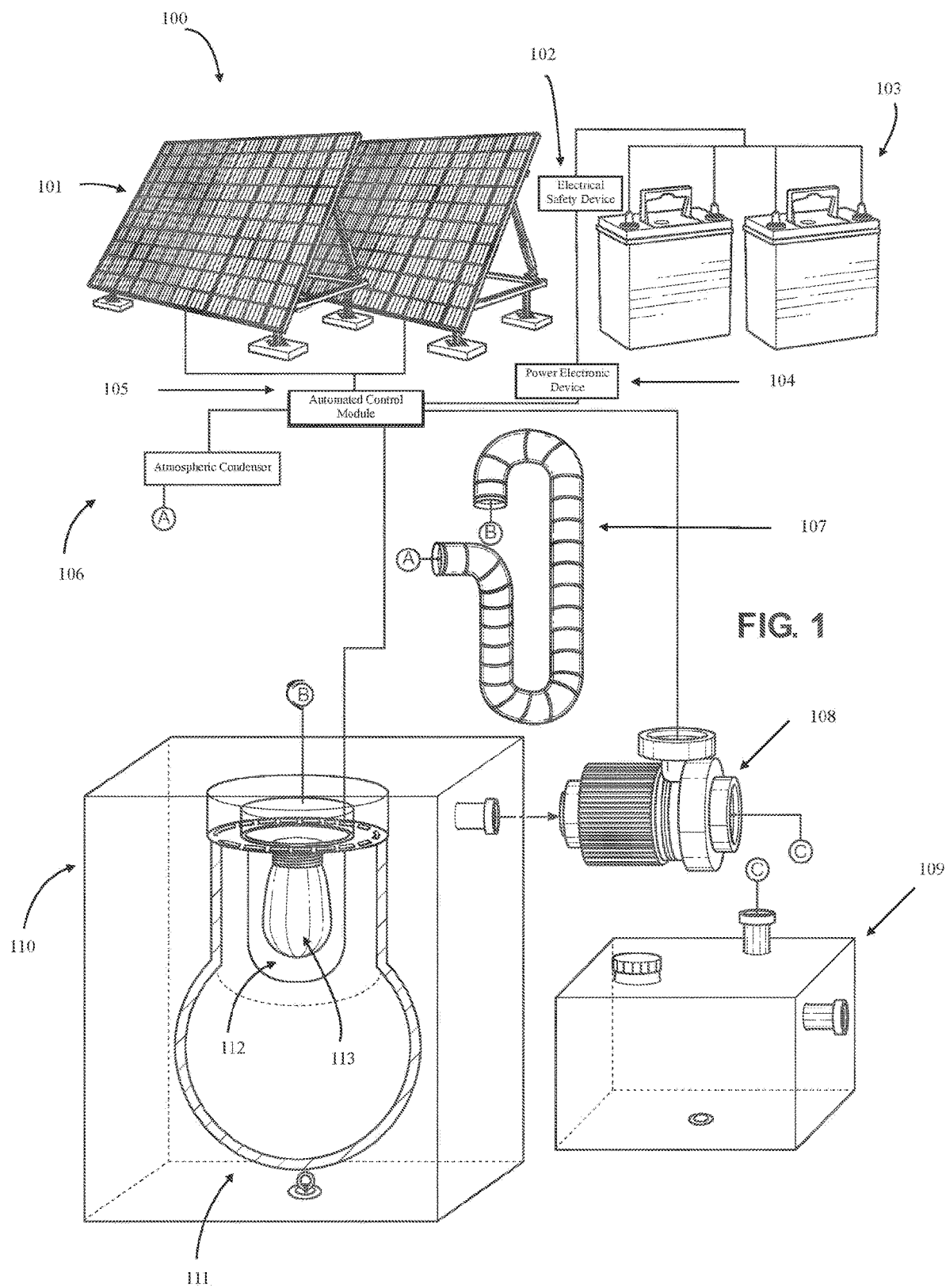
FIG. 1 shows a perspective view of the system and its components.

FIG. 1 shows a front view of the fresh water producing system 100. The system comprises of one or more components. The one or more components comprise of a renewable energy power system, an automated control module 105, an atmospheric condenser system 106, at least one conveyor 107, an aquatic suction device 108, a water reservoir 109, a water purification filtration system 110. The renewable energy power system may comprise of at least one solar panel 101, at least one electrical safety device 102, one or more energy storage mediums 103, and at least one power electronic device 104.

The renewable energy power system may comprise of at least one solar panel 101 at least one electrical safety device 102, one or more energy storage mediums 103, and at least one power electronic device 104. The at least one solar panel 101 and the at least one energy storage 103 medium are coupled in a standard manner for working jointly. The at least one electrical safety device 102 may be, for example, a fuse or other device that operates to provide overcurrent protection of an electrical circuit. The at least one energy storage medium 103 may, for example, be a battery. The at least one power electronic device 104 may be, for example, an inverter or other device or circuitry that changes direct current to alternating current. The energy storage medium 103 stores energy produced by the solar panel 101. The energy storage medium 103 powers the system when there is little or no sunshine for the production of energy. The solar panel 101 may be a panel with at least 300 watts. The solar panel 101 may comprise of any combination of silicon ingots cells, including monocrystalline or polycrystalline cells. The electrical safety device 102 may be coupled in a standard manner for working jointly. The renewable power system may be independent of any external power supply and may further couple to an automated control module.

The renewable power system may be independent of any external power supply and may couple to an automated control module. The renewable power system may not require any supplemental power supply; however, a supplemental power supply may be optionally coupled to the system. The renewable energy power system may also couple in a standard manner for working jointly with the automated control module 105. The automated control module 105 may comprise of various electrical circuits to control the energy entering and leaving the system and all system processes. The automated control module 105 may be the connecting center for all of the components.

The automated control module 105 may be the connecting center for all of the components of the system. The automated control module 105 may comprise of an integrated circuit to control and distribute the energy produced and provided by the renewable power system. The energy may be distributed to the atmospheric condenser system 106, water purification filtration system 110, and the water reservoir 109. The automated control module 105 may extract the energy produced by the solar panel 101 and store the produced energy in the energy storage medium 103. The automated control module 105 may comprise of a device with fully integrated system load sharing and battery charge management. The automated control module 105 may power the system via output terminals while independently charging the battery. The automated control module 105 may comprise of charge controllers to prevent the battery from being overcharged. The system further comprises of a water purification filtration system 110.

The water purification filtration system 110 comprises of a multi layered filtration system. The multi layered filtration system may include a reverse osmosis media 111, a water inlet filtration aperture 112, and an electromagnetic radiation system 113. The electromagnetic radiation system 113 may for example be an Ultraviolet light or any similar component with similar functionalities. Each component within the filtration system 110 work jointly to remove bacterial agents or chemical agents, that may be harmful to a user, within the liquid agent. The water purification filtration system 110 may exist within a stainless-steel housing.

The water purification filtration system 110 may exist within a stainless-steel housing. The stainless-steel housing may comprise of at least one interior wall, at least one exterior wall, at least one front wall, at least one back wall, at least two side walls, at least one top wall, and at least one bottom wall. The interior and exterior walls being substantially parallel to each other. The water purification filtration system 110 may be confined within the interior walls of the stainless-steel housing. The water purification filtration system may couple at a top opening to at least one conveyor 107, the conveyor may be for example a media filter pipe or a similar water receptor. At least one aquatic suction device 108 may couple to a side opening of the stainless-steel housing. The stainless-steel housing may further include at least one bottom opening. Coupled to the aquatic suction device 108 is a water reservoir 109.

Figures 2, 3:
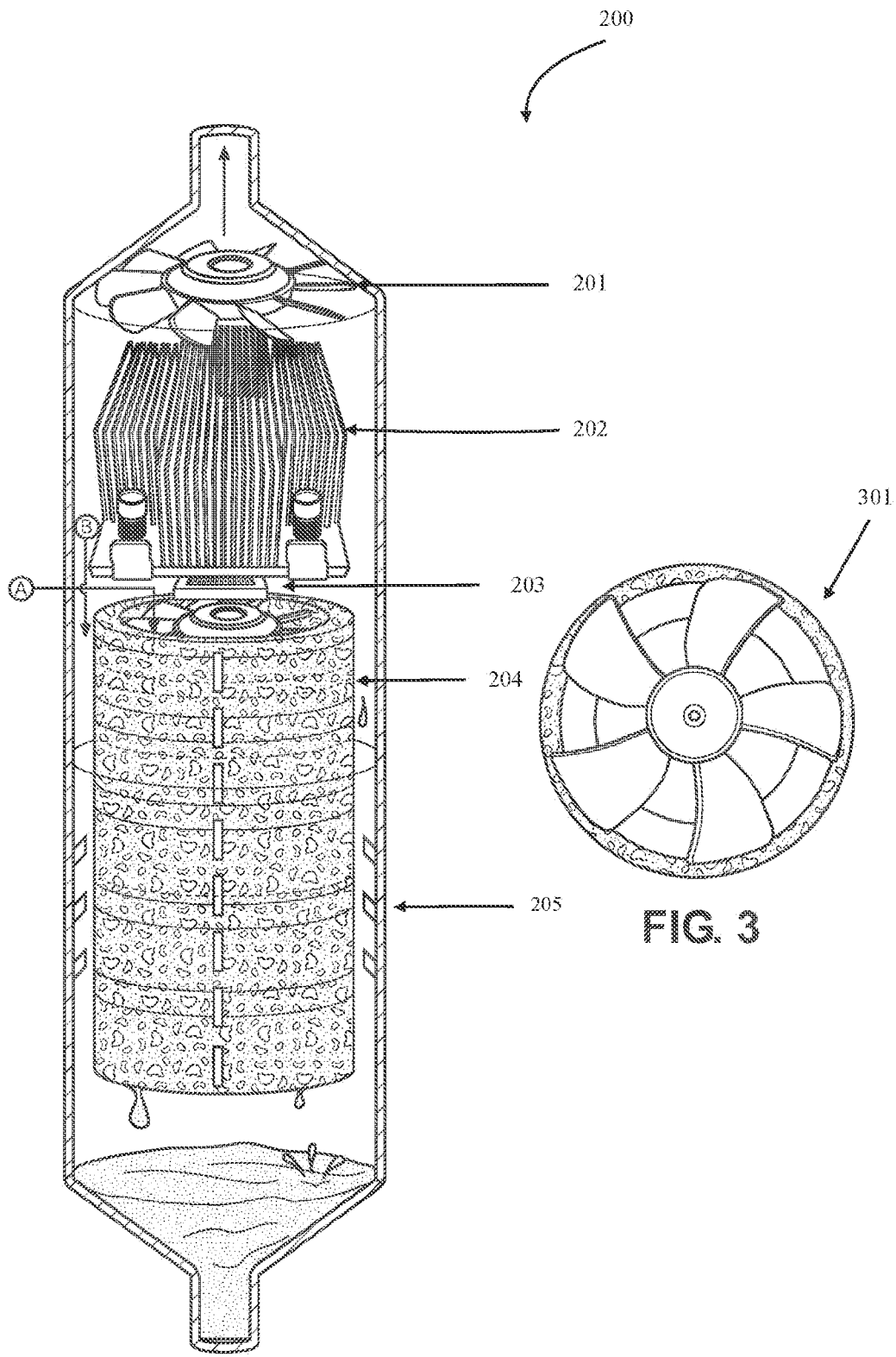
FIG. 2 shows a perspective view of the Atmospheric Condenser system.
FIG. 3 shows a top view of the Atmospheric Condenser system.

The aquatic suction device 108 may be coupled to a water reservoir 109. The aquatic suction device may for example be a water pump. The water reservoir 109 may be a device that is fit to hold a predetermined amount of liquid. The water reservoir 109 may be made of a plastic, metal, or other similar material. The water reservoir 109 may comprise of a front wall, a back wall, a top wall, a bottom wall, and at least two side walls, fixedly coupled to provide support for the specified amount of liquid disposed within. The water reservoir 109 may comprise of at least four openings. A first opening may allow for the coupling of the aquatic suction device 108 at a top portion of the water reservoir 109. A second opening may be disposed at a side portion of the water reservoir 109 to allow for the extraction of liquid. Turning attention to FIG. 2.

FIG. 2 shows a front view of the atmospheric condenser system 200. The atmospheric condenser system 200 may comprise of various components. The atmospheric condenser system 200 may comprise of at least one powered machine 201 to create a flow of air, a thermal management machinery 202, a thermal control module 203, and a hydrophilic metal casing 204. The type of metal may be, for example, copper, aluminum, or stainless steel. The at least one powered machine to create a flow of air may, for example, be an electrical fan. The thermal management machinery may, for example, be a heat sink. The thermal control module may, for example, be a peltier circuit or any similar monolithic integrated circuit. All of the components may exist within the interior of a hollow cylinder housing 205. The hollow cylinder housing may comprise of a set of interior hollow cylinders and at least two openings, a top opening and a bottom opening. The top opening may allow for outside air to enter the hollow cylinder housing 205. The bottom opening may function as a water receptor. Turning attention to FIG. 3.

Figure 4:
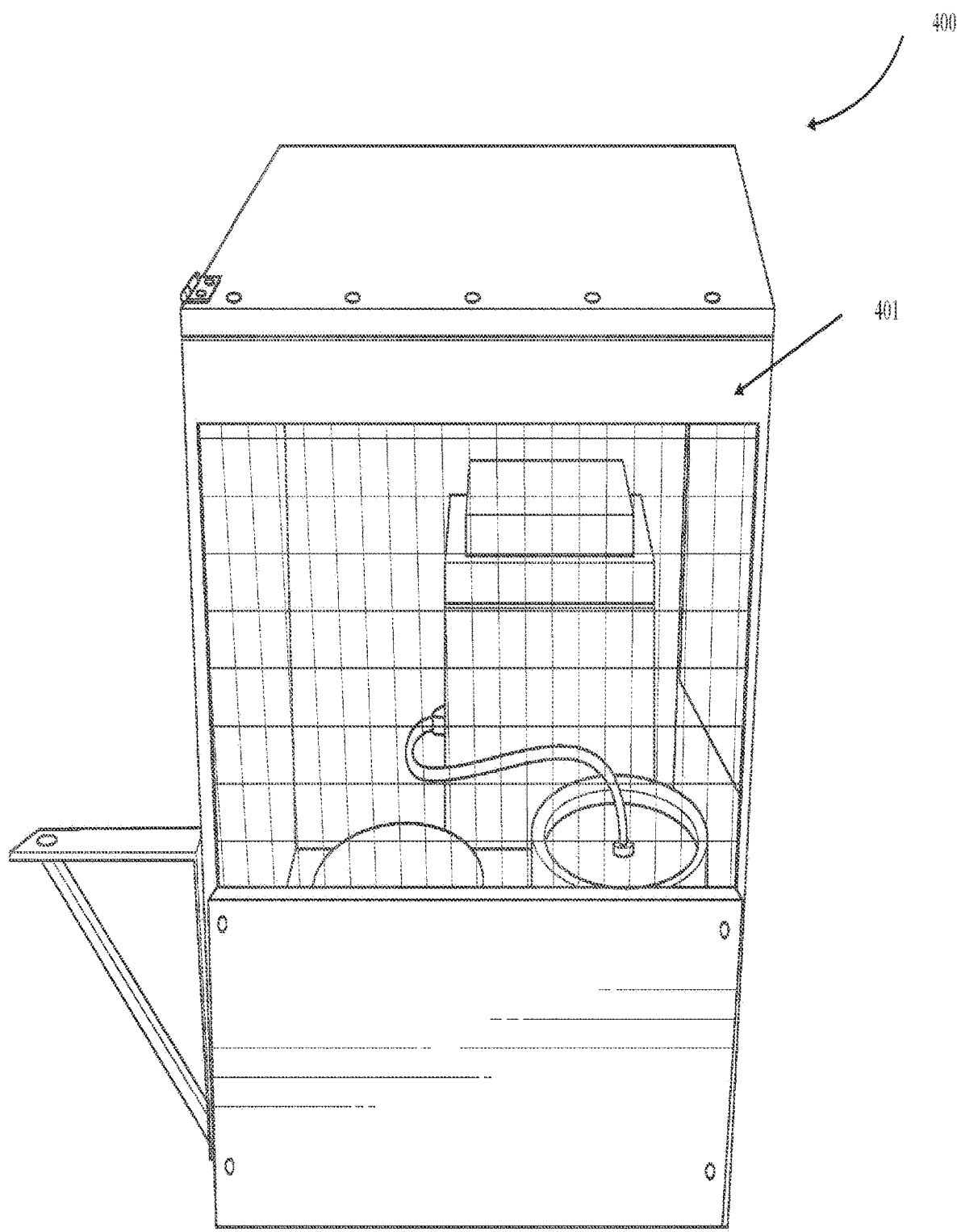
FIG. 4 shows a perspective view of a housing for the system.

FIG. 3 shows a top view of the atmospheric condenser system 301. The atmospheric condenser system consists of a top opening. The top opening of the system facilitates the intake of atmospheric air through the interior of the hollow casing. Moisture content of the atmosphere is conveyed across the cylindrical interior interface(s). The interior interface(s) temperature is induced to achieve dew point by at least one thermal control module attached to the surface. Once dew point is achieved, the ambient air flow will turn to liquid and adhere to the cylinder interior surface. By means of gravity or flow of air, the condensation will travel across the surf ace interface into the water receptor at the bottom opening. Thermal management machinery will assist with monitoring and regulating the temperature for inducing condensation in order to achieve dew point throughout the top and bottom of the hollow cylindrical housing. Turning attention to FIG. 4.

Figure 5:
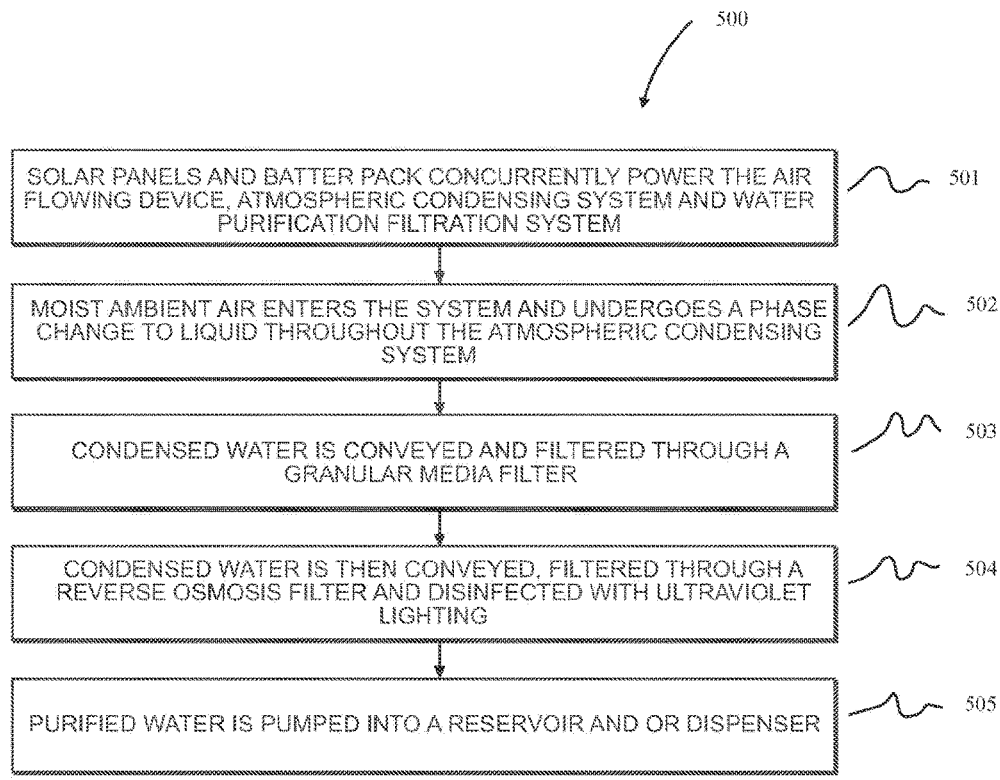
FIG. 5 shows a flow chart of the process flow of system and its components.

FIG. 4 shows a perspective view of a housing for the fresh water producing system 400. The housing may be of a wooden, metal, aluminum, or other similar material 401. The housing will provide a proper covering and protection to all of the components of the system. Specifically, the housing may comprise of at least one interior and exterior wall, at least one front wall, at least one back wall, at least two side walls, at least one top wall, and at least one bottom wall. The solar panel of the renewable energy power system may be affixed to a side portion of the housing (not shown). The automated control module (not shown), the atmospheric condenser system (not shown), water purification filtration system (not shown), and a water reservoir may lie within the interior portions of the housing. At a side portion of the housing, an opening may allow for the retrieval and or expulsion of fresh water (not shown). FIG. 5 shows a flow chart of the water producing system.

FIG. 5 shows a flow chart of the water producing system 500. At step 501 the renewable energy power system concurrently powers the air flowing device, atmospheric condensing system and water purification filtration system. At step 502, moist ambient air enters the system and undergoes a phase change to liquid throughout the atmospheric condensing system. At step 503, condensed water is conveyed and filtered through a water inlet filtration aperture. At step 504, condensed water is conveyed and filtered through a reverse osmosis media and disinfected with ultraviolet lighting. At step 505, purified water is pumped into a reservoir and or dispenser.

Figure 6:
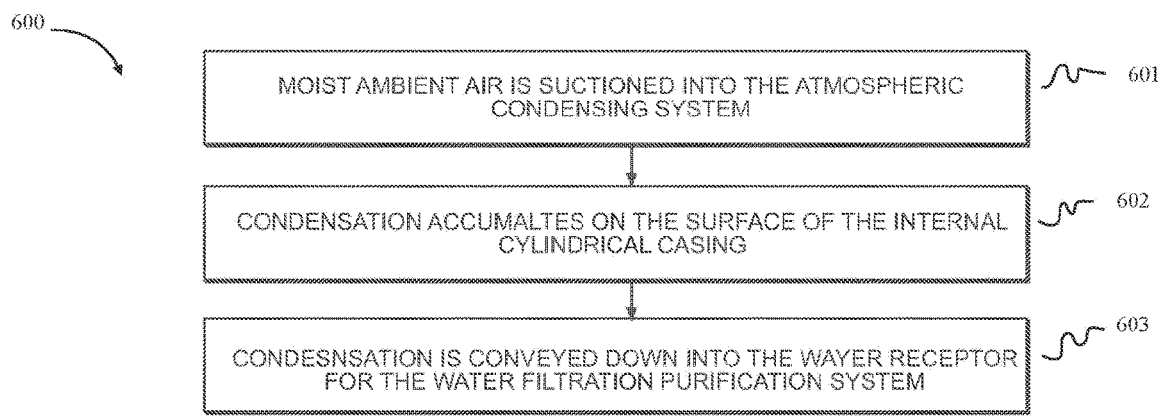
FIG. 6 shows a flow chart of the process flow of the Atmospheric Condenser system.

FIG. 6 shows a flow chart of the atmospheric condenser system 600. At step 601, moist ambient air is suctioned into the invention's atmospheric condensing system. At step 602, condensation accumulates on the surface of the internal cylindrical casing. At step 603, condensation is conveyed down into the water receptor for the water filtration purification system.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in the disclosure.

All features disclosed in the specification, including the claims, abstracts, and drawings, and all steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or some similar purpose, unless expressly stated otherwise. Thus, unless expressly stated otherwise, each feature disclosed is one example only of a generic series of equivalent or similar features.

While the present invention generally described herein has been disclosed in connection with a number of embodiments shown and described in detail, various modifications should be readily apparent to those of skill in the art.

What is claimed is:

1. A fresh water producing system comprising:
   a renewable energy power system;
   a water purification filtration system encased within a housing;
   an automated control module coupled to the renewal energy power system;
   an atmospheric condenser system coupled to the automated control module;
   a conveyor having a top opening coupled to the water purification filtration system;
   an aquatic suction device being coupled to a side opening of the housing; and
   a water reservoir;
   wherein the water purification filtration system includes at least four filtration layers: a first layer including a reverse osmosis media, a second layer including a water inlet filtration aperture, a third layer including an electromagnetic radiation system, and a fourth layer including a hydrophilic metal casing;
   wherein when ambient air enters the fresh water producing system, the ambient air is (i) processed via the atmospheric condenser system (ii) distilled through the water purification filtration system (iii) transported through the aquatic suction device and (iv) disposed into the water reservoir.

2. The fresh water producing system of claim 1, wherein the renewable energy power system comprises at least one solar panel, at least one electrical safety device, one or more energy storage mediums, and at least one power electronic device.

3. The fresh water producing system of claim 1, wherein the atmospheric condenser system is directly coupled to a monolithic integrated circuit.

4. The fresh water producing system of claim 1, wherein the atmospheric condenser system is communicatively coupled to a monolithic integrated circuit.

5. The fresh water producing system of claim 1, wherein the electromagnetic radiation system is disposed within the water inlet filtration aperture.

6. The fresh water producing system of claim 1, wherein the water inlet filtration aperture is disposed within the reverse osmosis media and the reverse osmosis media is disposed within the hydrophilic metal casing.

7. The fresh water producing system of claim 1, wherein the atmospheric condenser system includes a hollow cylinder housing.

8. The fresh water producing system of claim 7, wherein the hollow cylinder housing includes a hydrophilic metal casing disposed within, and the hydrophilic metal casing comprises of at least one of copper, aluminum, or stainless steel material.

9. The fresh water producing system of claim 8, wherein the hydrophilic metal casing encloses a powered machine and a monolithic integrated circuit.

10. The fresh water producing system of claim 1, wherein the automated control module is fixedly and communicatively coupled to the renewable energy power system, the atmospheric condenser system, the water purification filtration system, and the conveyor.

11. The fresh water producing system of claim 1, wherein the water purification filtration system is fixedly coupled to the conveyor and the aquatic suction device.

* * * * *